United States Patent
Gridish et al.

(10) Patent No.: US 11,336,374 B1
(45) Date of Patent: May 17, 2022

(54) OPTICAL COMMUNICATION MODULES AND CABLES

(71) Applicant: Mellanox Technologies, Ltd., Yokneam (IL)

(72) Inventors: Yaakov Gridish, Yoqneam Ilit (IL); Lion Bassat, Pardes Hana Karkur (IL); Elad Mentovich, Tel Aviv (IL); Dimitrios Kalavrouziotis, Papagou (GR); Hanan Shumacher, Kohav Yair (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 17/168,488

(22) Filed: Feb. 5, 2021

(30) Foreign Application Priority Data

Jan. 21, 2021 (GR) .............................. 20210100038

(51) Int. Cl.
H04B 10/40 (2013.01)

(52) U.S. Cl.
CPC .................... H04B 10/40 (2013.01)

(58) Field of Classification Search
CPC ...................................... H04B 10/40
USPC ......................................... 398/135
See application file for complete search history.

(56) References Cited

U.S. PATENT DOCUMENTS

| | | | | |
|---|---|---|---|---|
| 6,735,361 B2 * | 5/2004 | Gilliland | ............. | G02B 6/3869 385/37 |
| 7,171,081 B1 * | 1/2007 | Ko | ..................... | G02B 6/29361 385/31 |
| 7,350,984 B1 * | 4/2008 | Togami | ................ | G02B 6/4201 385/139 |
| 9,106,338 B2 * | 8/2015 | Hui | ......... | H04B 10/40 |
| 2002/0110313 A1 * | 8/2002 | Anigbo | ............. | G02B 6/29362 385/24 |
| 2003/0152336 A1 * | 8/2003 | Gurevich | ............. | G02B 6/4246 385/88 |
| 2004/0069997 A1 * | 4/2004 | Dair | ..................... | G02B 6/4214 257/81 |
| 2004/0161240 A1 * | 8/2004 | Weber | ..................... | G11B 5/00 398/139 |
| 2004/0175077 A1 * | 9/2004 | Weber | ..................... | H04J 14/02 385/88 |
| 2007/0237472 A1 * | 10/2007 | Aronson | ............. | G02B 6/4292 385/101 |
| 2013/0230278 A1 * | 9/2013 | Hung | ..................... | G02B 6/12 385/14 |

(Continued)

Primary Examiner — Dalzid E Singh
(74) Attorney, Agent, or Firm — Alston & Bird LLP (57) ABSTRACT

Optical communication modules, optical communication cables, and associated methods of manufacturing are provided. An example optical communication module includes a substrate supporting a first optical transceiver and a second optical transceiver. The first optical transceiver includes a first optical transmitter that generates optical signals having a first wavelength and a first optical receiver that receives optical signals having a second wavelength. The second optical transceiver includes a second optical transmitter that generates optical signals having the second wavelength and a second optical receiver that receives optical signals having the first wavelength. One or more lens assemblies coupled with the respective transceivers may be used to direct optical signal generated by and directed to the respective transceivers.

20 Claims, 6 Drawing Sheets

(56) References Cited

U.S. PATENT DOCUMENTS

| | | | |
|---|---|---|---|
| 2014/0248057 A1* | 9/2014 | Li | G02B 6/4446 398/82 |
| 2016/0192044 A1* | 6/2016 | Raza | G02B 6/3885 398/49 |
| 2020/0287629 A1* | 9/2020 | Han | G02B 3/005 |

* cited by examiner

OPTICAL COMMUNICATION MODULES AND CABLES

CROSS-REFERENCE TO RELATED APPLICATIONS

This application claims priority to Greek Patent Application No. 20210100038, filed Jan. 21, 2021, which application is incorporated by reference herein in its entirety.

TECHNOLOGICAL FIELD

Example embodiments of the present disclosure relate generally to communication systems and, more particularly, to networking communication modules used in optical communication systems.

BACKGROUND

Datacenters and other networking environments may include connections between switch systems, servers, racks, and other devices in order to provide for signal transmission between one or more of these elements. Such connections may be made using cables, transceivers, networking boxes, modules, printed circuit boards (PCBs), and connector assemblies, each of which may have a different size, shape, form factor, or the like as defined by applicable regulations or standards. Applicant has identified a number of deficiencies and problems associated with conventional networking modules and cables. Through applied effort, ingenuity, and innovation, many of these identified problems have been solved by developing solutions that are included in embodiments of the present disclosure, many examples of which are described in detail herein.

BRIEF SUMMARY

Apparatuses, systems, and associated methods of manufacturing are provided for improved optical communication modules and cables. An example optical communication module may include a substrate, a first optical transceiver supported by the substrate, and a second optical transceiver supported by the substrate. The first optical transceiver may include a first optical transmitter configured to generate optical signals having a first wavelength, and a first optical receiver configured to receive optical signals having a second wavelength. The second optical transceiver may include a second optical transmitter configured to generate optical signals having the second wavelength, and a second optical receiver configured to receive optical signals having the first wavelength.

In some embodiments, the optical communication module may include a first optical communication medium in optical communication with the first optical transceiver, and a second optical communication medium in optical communication with the second optical transceiver. In such an embodiment, the optical communication module may further include a connector operably coupled with the first optical communication medium and the second optical communication medium, the connector may be configured to engage a corresponding connector of a networking system.

In some further embodiments, the optical communication module may include a first lens assembly coupled with the first optical transceiver. The first lens assembly may include a filter configured to pass optical signals received from the first optical transmitter having the first wavelength into the first optical communication medium and direct optical signals received from the first optical communication medium having the second wavelength into the first optical receiver. In such an embodiment, the first lens assembly may further include a first reflective surface proximate the first optical transmitter configured to reflect optical signals generated by the first optical transmitter for transmission by the first optical communication medium. The first lens assembly may also include a second reflective surface proximate the first optical receiver and supporting the filter, and the second reflective surface may be configured to reflect optical signals received from the first optical communication medium to the first optical receiver.

In some embodiments, the optical communication module may include a second lens assembly coupled with the second optical transceiver. The second lens assembly may include a filter configured to direct optical signals received from the second optical transmitter having the second wavelength into the second optical communication medium. The second lens assembly may also be configured to pass optical signals received from the second optical communication medium having the first wavelength into the second optical receiver. In such an embodiment, the second lens assembly may further include a first reflective surface proximate the second optical transmitter supporting the filter. The first reflective surface may be configured to reflect optical signals generated by the second optical transmitter for transmission by the second optical communication medium. The second lens assembly may further include a second reflective surface proximate the second optical receiver configured to reflect optical signals received from the second optical communication medium to the second optical receiver.

The optical communication module of any of the above embodiments may be disposed on opposite ends of optical communication medium(s) to form an optical communication cable as described hereinafter.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Embodiments of the present disclosure now will be described more fully hereinafter with reference to the accompanying drawings in which some but not all embodiments are shown. Indeed, the present disclosure may be embodied in many different forms and should not be construed as limited to the embodiments set forth herein; rather, these embodiments are provided so that this disclosure will satisfy applicable legal requirements. Like numbers refer to like elements throughout. As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As noted above and described hereafter, networking systems, such as those found in datacenters, may establish inter-rack connections between racks and intra-rack connections between networking boxes, PCBs, and the like located within the same rack. These connections often rely upon transceivers, processors, chipsets, PCBs, connectors, networking cables, optical cable assemblies, copper cable assemblies, and associated communication system components that are constrained by regulations (e.g., industry standards or the like) that regulate the overall size of these components, define the shape of these components, and/or specify the types of connections between components. By way of example, emerging transceivers/modules such as Octal Small Form Factor Pluggable (OSFP) and Quad Small Form Factor Pluggable Double Density (QSFP-DD) transceivers/modules employ eight (8) high speed lanes that increase system bandwidth and data transmission as compared to prior legacy components (e.g. legacy transceivers, modules, and/or the like). By way of example, Quad Small Form Factor Pluggable (QSFP) modules, Small Form-factor Pluggable (SFP) modules, and/or the like employ only four (4) high speed lanes and may be prevalent in legacy networking systems (e.g., datacenters, high-performance computing systems, etc. that rely upon legacy components).

These legacy components may further, for example, use pluralities of parallel modules that each include a plurality of optical transmitters (e.g., vertical-cavity surface-emitting laser (VCSELs) or the like) that are specifically designed for transmission with only corresponding optical receivers (e.g. photodiodes or the like). Said differently, conventional transceivers and modules used in networking systems may traditionally be customized for a specific solution or application in that each VCSEL of a particular module may transmit optical signals having the same wavelength for receipt by a corresponding photodiode configured to receive optical signals of said wavelength. As part of retrofitting, upgrading, or otherwise improving the operating capabilities of networking systems, these legacy components may be replaced with emerging transceivers and modules (e.g., QSFP-DD modules, OSFP modules, etc.). In doing so, the emerging transceivers/modules may be required to maintain the same size, shape, form factor, dimensions, and/or other features of these legacy components in order to be properly received by the corresponding networking equipment (e.g., datacenter rack, networking boxes, etc.).

In short reach applications, parallel optical interconnects may be common in which dedicated optical fibers are present for each direction of travel (e.g., one for fiber for transmission and one fiber for receipt). Furthermore, each dedicated optical fiber may include a corresponding dedicated VCSEL and photodiode on each end of the fiber. As the number of channels increases, the number of fibers also increases resulting in increased manufacturing costs. In other conventional applications, wavelength division multiplexing (WDM) may be employed for optical links in which multiple signals are transmitted into a single optical fiber with each signal using a different optical wavelength. However, WDM transmission techniques are often complex and expensive. Additionally, the de-multiplexing of the multiplexed optical signal into separate signals on the opposite end of the fiber is also expensive and complex and further incurs significant optical power loss.

In order to address these issues and others, the devices of the present disclosure provide optical modules that include two transceivers (e.g., a first optical transceiver and a second optical transceiver) that each include an optical transmitter and optical receiver configured to operate at different wavelengths. As described hereafter, the optical transmitter of the first optical transceiver and the optical receiver of the second optical transceiver may operate at a first wavelength, and the optical transmitter of the second optical transceiver and the optical receiver of the first optical transceiver may operate at a second wavelength. In this way, the embodiments of the present application may improve the operational capabilities of networking components (e.g., provide increased bandwidth and data transmission) while maintaining, when necessary, the form factor associated with legacy networking systems via an adaptable module solution. Said differently, the embodiments of the present disclosure provide a module structure that may be adaptable, via wavelength selection or the like, to a variety of potential networking applications.

Furthermore, the embodiments of the present disclosure enable two-way communication over a single optical fiber. By using two different optically-modulated wavelengths traveling in opposite directions inside a single optical fiber, the embodiments described hereafter may reduce the number of optical transceivers and associated optical fibers necessary for networking applications. Unlike conventional systems that rely upon parallel optical interconnects with dedicated optical fibers, VCSELs, and photodiodes and/or complex WDM approaches, the two-way communication described herein may significantly reduce the material and manufacturing costs by halving the number of optical fibers and optical connectors needed for networking connections.

Optical Communication Module

Figure 1:
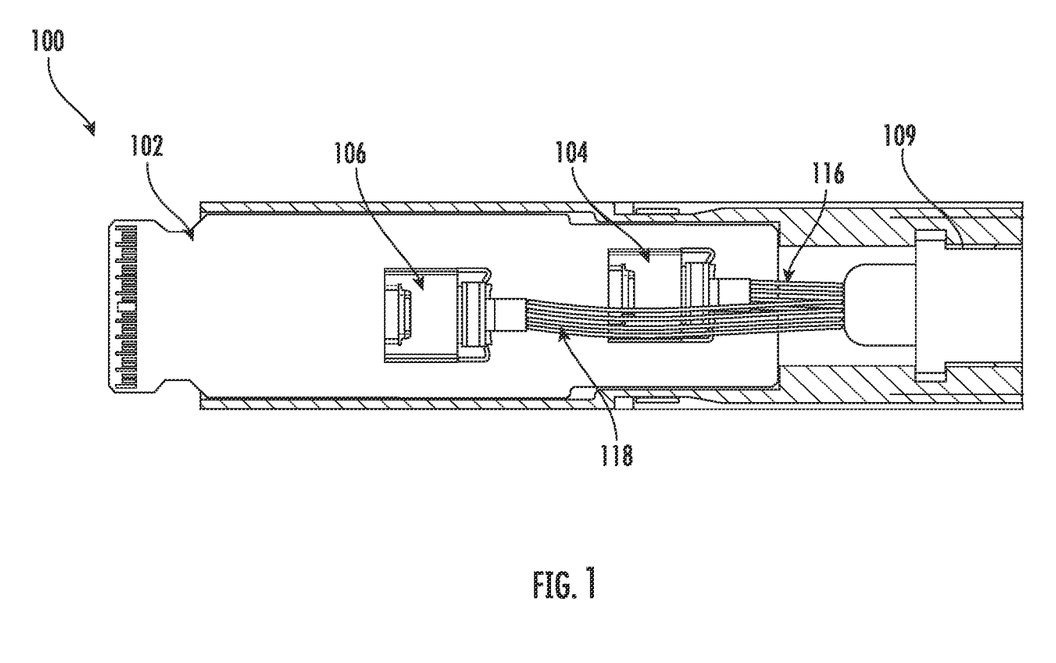
FIG. 1 illustrates an example optical communication module in accordance with some embodiments described herein.

With reference to FIG. 1, an optical communication module 100 is illustrated. As shown, the optical communication module 100 may include a first substrate 102 supporting a first optical transceiver 104 and a second optical transceiver 106. As described herein, the first optical transceiver 104 may be in optical communication with a first optical communication medium 116 such that optical signals generated the optical transceiver (e.g., generated by an optical transmitter) may be transmitted by the first optical communication medium 116, and optical signals transmitted by the first optical communication medium 116 may be received by the first optical transceiver 104 (e.g., received by an optical receiver). As described hereafter with reference to FIGS. 2 and 4, the optical communication module 100 may be, in some embodiments, configured to operably connect with a networking cable (e.g., via connector 109) so as to transmit optical signals to and receive optical signals from another optical communication module operably connected with the networking cable. In other embodiments, as described hereafter with reference to FIG. 5, the optical module 100 may be formed as part of an optical communication cable. For example, the optical module 100 may be disposed on one end of an optical communication medium (e.g., a first optical communication medium 116 and second optical communication medium 118 bundled in a common wire harness or otherwise), and another optical module may be disposed on an opposite end of the optical communication medium.

The optical communication module 100 includes a first substrate 102 that may comprise a printed circuit board (PCB) configured to provide electrical communication to various optoelectronic components (e.g., the first optical transceiver 104 and the second optical transceiver 106) supported thereon. The first substrate 102 (e.g., the PCB) may, in some embodiments, comprise a dielectric material, a glass material, a polymer material, an amorphous material, or the like. Said differently, the present disclosure contemplates that the first substrate 102 (e.g., the PCB) may comprise any material configured for use with optoelectronic components and/or configured to define or support electrical connection elements or features (e.g., wires, traces, etc.) to provide electrical connectivity between optoelectronic components. Furthermore, the first substrate 102 may further support one or more circuitry components (not shown) operably coupled with the first optical transceiver 104 and the second optical transceiver 106. For example, the substrate may support one or more controllers, chipsets, power regulators, switches, amplifiers, optical dispersion circuitry, or the like configured to, in whole or in part, control operation of the first optical transceiver 104 and the second optical transceiver 106.

As described above, the optical communication module 100 may be used to replace legacy networking components as part of retrofitting, upgrading, or otherwise improving the operating capabilities of networking systems. As such, the first substrate 102 and optoelectronic components supported thereon may be dimensioned (e.g., sized and shaped) so as to comply with applicable industry standards, regulations, multi-source agreements (MSAs), or the like. By way of example, the optical communication module 100 may be configured for use with a QSFP-DD or OSFP connection such that the first substrate 102 may be dimensioned (e.g. sized and shaped) so as to be housed by a corresponding housing that complies with applicable QSFP-DD or OSFP form factor regulations. Although described herein with reference to QSFP-DD and OSFP connections, the present disclosure contemplates that the configuration (e.g., size, shape, relative positioning of optoelectronic components, etc.) of the optical communication module 100 may vary based upon the intended application of the optical communication module 100.

Figure 2:
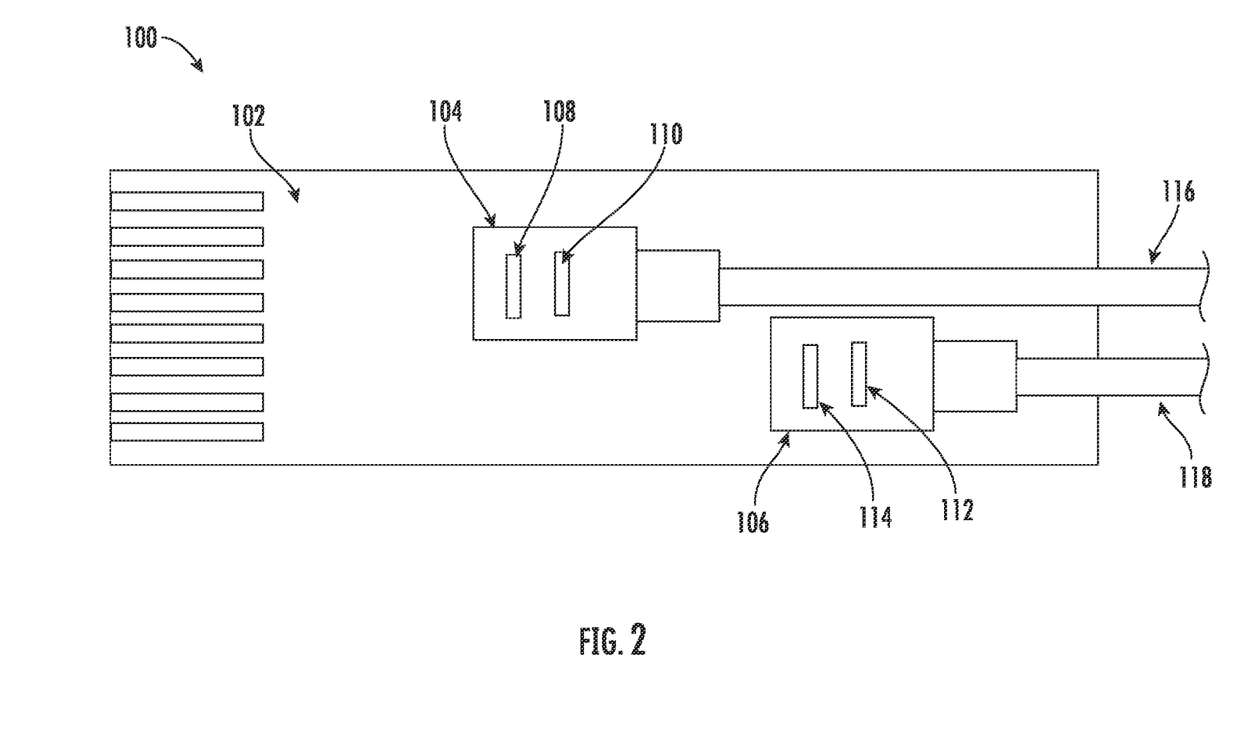
FIG. 2 illustrates the optical communication module of FIG. 1 and associated optical transceiver components in accordance with some embodiments described herein.

With reference to FIG. 2, the optical communication module 100 may include the first optical transceiver 104 that includes a first optical transmitter 108. The first optical transmitter 108 may be configured to generate optical signals having a first wavelength. By way of example, the first optical transmitter 108 may include a VCSEL configured to generate optical signals having a first wavelength for transmission to the first optical communication medium 116 for receipt by a corresponding optical receiver (e.g., third optical receiver 410 in FIG. 4) in optical communication with the first optical communication medium 116. In some embodiments, the first optical transmitter 108 may be configured to generate optical signals for transmission by four (4) transmission lanes such that the first optical communication medium 116 may similarly define four (4) distinct optical fibers optically coupled with the first optical transmitter 108. By way of example, the first optical transmitter 108 may be configured to generate optical signals having a wavelength of 850 nm for transmission via four (4) transmission lanes at a bandwidth of, for example, 50 Gb/s. Although described herein with reference to optical signals having a wavelength of 850 nm, the present disclosure contemplates that the first optical transmitter 108 may be configured to generate optical signals having any wavelength based upon the intended application of the optical communication module 100 as described hereafter with reference to FIGS. 3A-3B.

As shown in FIG. 2, the first optical transceiver 104 may further include a first optical receiver 110. The first optical receiver 110 may be configured to receive optical signals having a second wavelength different from the first wavelength. By way of example, the first optical receiver 110 may be configured to receive optical signals having the second wavelength transmitted by the first optical communication medium 116 from a corresponding optical transmitter (e.g., third optical transmitter 408 in FIG. 4) in optical communication with the first optical communication medium 116. In some embodiments, the first optical receiver 110 may include a photodiode configured to receive optical signals from four (4) transmission lanes transmitted by four (4) distinct optical fibers of the first optical communication medium 116 optically coupled with the first optical receiver 110. By way of example, the first optical receiver 110 may be configured to receive optical signals having a wavelength of 910 nm from four (4) transmission lanes at a bandwidth of, for example, 50 Gb/s. Although described herein with reference to optical signals having a wavelength of 910 nm, the present disclosure contemplates that the first optical receiver 110 may be configured to receive optical signals having any wavelength that is different from the wavelength of the optical signals transmitted by the first optical transmitter 108 based upon the intended application of the optical communication module 100. As described hereafter with reference to FIGS. 3A-3B, the first optical transceiver 104 (e.g., any optical transceiver described herein) may be coupled with a corresponding lens assembly configured to filter and/or direct optical signals from and to the first optical transmitter 108 and the first optical receiver 110, respectively.

The optical communication module 100 may further include the second optical transceiver 106 that includes a second optical transmitter 112. The second optical transmitter 112 may be configured to generate optical signals having the second wavelength (e.g., the same wavelength as the first optical receiver 110). By way of example, the second optical transmitter 112 may include a VCSEL configured to generate optical signals having a second wavelength for transmission to the second optical communication medium 118 for receipt by a corresponding optical receiver (e.g., fourth optical receiver 414 in FIG. 4) in optical communication with the second optical communication medium 118. In some embodiments, the second optical transmitter 112 may be configured to generate optical signals for transmission by four (4) transmission lanes such that the second optical communication medium 118 may similarly define four (4) distinct optical fibers optically coupled with the second optical transmitter 112. By way of example, the second optical transmitter 112 may be configured to generate optical signals having a wavelength of 910 nm for transmission via four (4) transmission lanes at a bandwidth of, for example, 50 Gb/s. As described above with reference to the first optical transmitter 108, the present disclosure contemplates that the second optical transmitter 112 may be configured to generate optical signals having any wavelength (e.g., the same wavelength as the first optical receiver 110) based upon the intended application of the optical communication module 100.

As shown in FIG. 2, the second optical transceiver 106 may further include a second optical receiver 114. The second optical receiver 114 may be configured to receive optical signals having the first wavelength (e.g., the same wavelength as generated by the first optical transmitter 108). By way of example, the second optical receiver 114 may be configured to receive optical signals having the first wavelength transmitted by the second optical communication medium 118 from a corresponding optical transmitter (e.g., the fourth optical transmitter 412 in FIG. 4) in optical communication with the second optical communication medium 118. In some embodiments, the second optical receiver 114 may include a photodiode configured to receive optical signals from four (4) transmission lanes transmitted by four (4) distinct optical fibers of the second optical communication medium 118 optically coupled with the second optical receiver 114. By way of continued example, the second optical receiver 114 may be configured to receive optical signals having a wavelength of 850 nm from four (4) transmission lanes at a bandwidth of, for example, 50 Gb/s. Although described herein with reference to optical signals having a wavelength of 850 nm, the present disclosure contemplates that the second optical receiver 114 may be configured to receive optical signals having any wavelength that is different from the second optical transmitter 112 (e.g., the same wavelength as the first optical transmitter 108) based upon the intended application of the optical communication module 100.

Figure 3A:
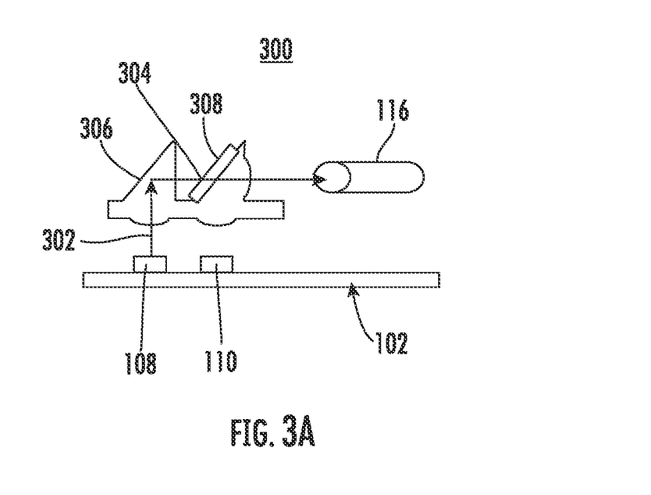
FIGS. 3A-3B illustrate an example lens assembly for use with some embodiments described herein.
Figure 3B:
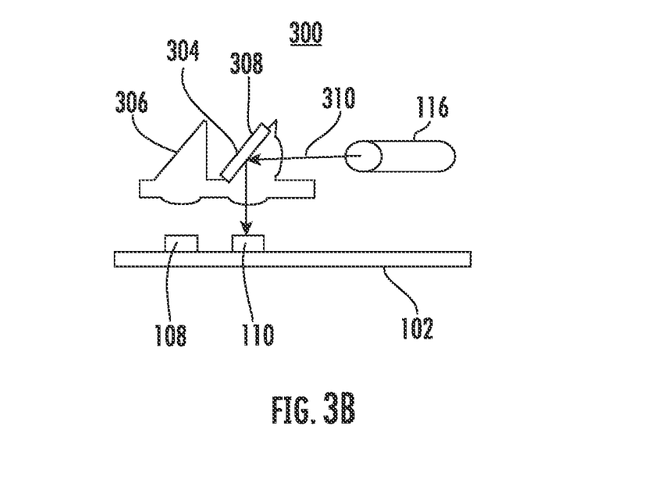

With reference to FIGS. 3A-3B, an example lens assembly 300 is illustrated for use with some optical communication module embodiments described herein. As described above, the optical communication module 100 of the present disclosure may be configured to improve the operational capabilities of networking components (e.g., provide increased bandwidth and data transmission) while maintaining, when necessary, the form factor associated with legacy networking systems and may provide a module structure that provides adaptable wavelength selection to address a variety of potential networking applications. In order to allow optical signals having different wavelengths to be transmitted by common optical communication mediums, the optical communication module may employ a lens assembly 300 that may be coupled (e.g., supported by the first substrate 102 or otherwise) to one or more of the optical transceivers 104, 106 described herein. An example lens assembly 300 is described hereafter with reference to the first optical transceiver 104. The present disclosure, however, contemplates that the operational principles of the lens assembly 300 may be equally applicable to the second transceiver 104 as well as a third optical transceiver and a fourth optical transceiver described hereafter.

As shown in FIGS. 3A-3B, the lens assembly 300 may include a first reflective surface 306, a second reflective surface 308, and a filter 304. The first reflective surface may be positioned proximate the first optical transmitter 108 and in optical communication with the first optical transmitter 108 so as to direct optical signals generated by the first optical transmitter 108 to the first optical communication medium 116. The second reflective surface 308 may be positioned proximate the first optical receiver 110 and in optical communication with the first optical receiver 110 so as to direct optical signals from the first optical communication medium 116 to the first optical receiver 110. The lens assembly 300 may use the filter 304 to pass optical signals received from the first optical transmitter 108 having the first wavelength into the first optical communication medium 116 as shown in FIG. 3A. By way of example, the first optical transmitter 108 may generate optical signals having a first wavelength (e.g., 850 nm), the first reflective surface 306 may reflect these optical signals toward the first optical communication medium 116 (e.g., into an optical path of the first optical communication medium 116), and the filter 304 may allow the optical signals to pass through the filter 304 and into the first optical communication medium 116.

Additionally, the filter may, in some embodiments, be supported by the second reflective surface 308 so as to direct optical signals received from the first optical communication medium 116 having the second wavelength into the first optical receiver 110 as shown in FIG. 3B. By way of example, the first optical communication medium 116 may transmit optical signals having the second wavelength (e.g., 910 nm), such as optical signal generated by the third optical transmitter 408 in FIG. 4, and the filter 304 supported by the second reflective surface 308 may reflect these optical signals from the first optical communication medium 116 (e.g., from the optical path of the first optical communication medium 116) into the first optical receiver 110. Said differently, the filter 304 may comprise a material configured to allow optical signals having the first wavelength to pass therethrough and configured to prevent optical signals having the second wavelength from passing therethrough. By way of continued example, the filter 304 may be configured to prevent optical signals having a wavelength of 910 nm from passing therethrough but may allow optical signals having a wavelength of 850 to pass therethrough.

The present disclosure contemplates that the first wavelength, the second wavelength, the filter 304, and the relative positioning between the first optical transmitter 108 and the first optical receiver 110 may be configured based upon the intended application of the optical communication module 100. For example, selection of a first optical transmitter 108 configured to generate optical signals having a first wavelength that is similar (e.g., within an applicable tolerance, range, threshold, etc.) to the second wavelength received by the first optical receiver 110 may result in interference. Said differently, a filter 304 configured to prevent optical signals having a second wavelength from passing therethrough may allow at least a portion of said signals to pass therethrough in an instance in which the second wavelength is approximately the same as the first wavelength (e.g., within an applicable tolerance, range, threshold, or the like). Additionally, selection of a first optical transmitter 108 configured to generate optical signals having a first wavelength that is substantially different from the second wavelength received by the first optical receiver 110 may require the relative positioning between the first optical transmitter 108 and the first optical receiver 110 to increase such that the dimensions of the optical communication module 100 fails to comply with applicable industry standards, regulations, or MSAs. As such, the present disclosure contemplates that the selection of the first wavelength and the second wavelength may be such that interference is prevented or reduced and that applicable industry form factor regulations are satisfied.

Furthermore, the present disclosure contemplates that the positions of the first optical transmitter 108 and the first optical receiver 110 may be reversed. By way of example, the first optical transmitter 108 may, in some embodiments, be positioned proximate the second reflective surface 308 supporting the filter 304, and the first optical receiver 110 may be positioned proximate the first reflective surface 306. In such an embodiment, the filter 304 may be configured to allow optical signals having the second wavelength to pass therethrough and may be configured to prevent optical signals having the first wavelength from passing therethrough. Said differently, the present disclosure contemplates that the filter 304 may be configured to prevent optical signals having a determined wavelength (or range of wavelengths) from passing therethrough or configured to allow optical signals having a determined wavelength (or range of wavelengths) to pass therethrough.

As described above, the lens assembly 300 may be equally applicable to the second transceiver 104. For example, a second lens assembly (not shown) may include a first reflective surface proximate the second optical transmitter 112 that supports the filter and is configured to reflect optical signals generated by the second optical transmitter 112 for transmission by the second optical communication medium 118. Furthermore, such a second lens assembly (not shown) may include a second reflective surface proximate the second optical receiver 114. The first reflective surface may be configured to reflect optical signals generated by the second optical transmitter 112 to the second optical communication medium 118. The filter of the first reflective surface may be configured to pass optical signals received from the second optical communication medium 118 to the second reflective surface that reflects said signals having the first wavelength into the second optical receiver 114.

Figure 4:
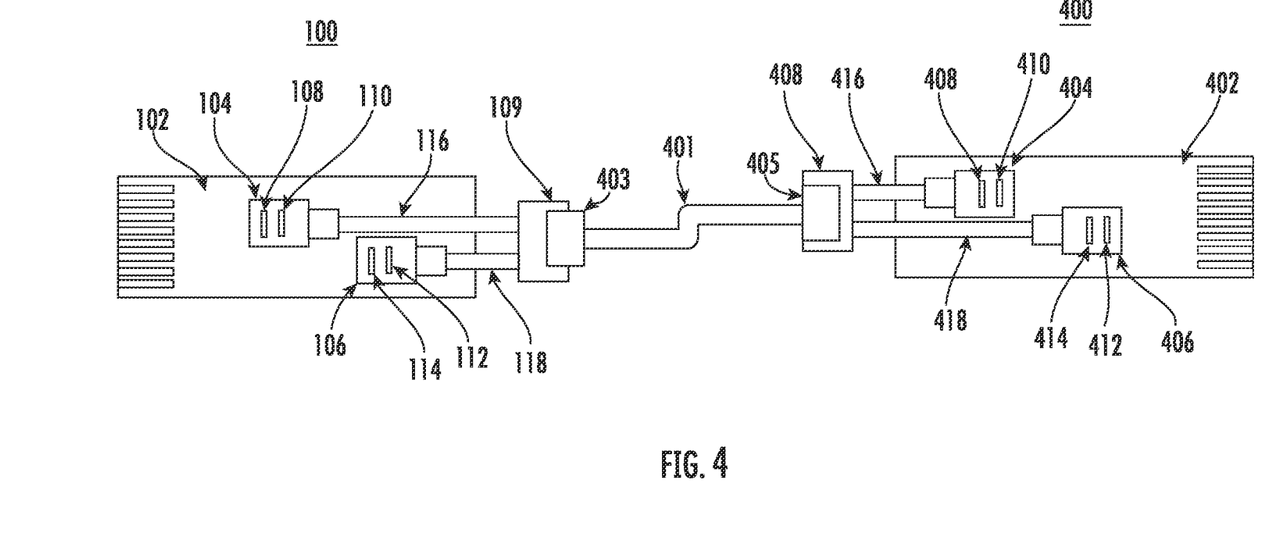
FIG. 4 illustrates the optical communication module of FIG. 1 connected with another optical communication module via a networking cable in accordance with some embodiments described herein.

With reference to FIG. 4, the optical communication module 100 is illustrated connected with a second optical communication module 400 via a networking cable 401. By way of example, the optical communication module 100 may be formed as part of a networking box, datacenter rack, or other computing device or networking system component. The second optical communication module 400 may be similarly formed as part of another networking box, datacenter rack, or other computing device or networking system component. Similar to the optical communication module 100 described above with reference to FIGS. 1-3B, the second optical communication module 400 may include a second substrate 402, a third optical transceiver 404, and a fourth optical transceiver 406.

The second optical communication module 400 may include the third optical transceiver 404 that includes a third optical transmitter 408. The third optical transmitter 408 may be configured to generate optical signals having the second wavelength. By way of example, the third optical transmitter 408 may include a VCSEL configured to generate optical signals having a wavelength of 910 nm for transmission via four (4) transmission lanes at a bandwidth of, for example, 50 Gb/s. Although described herein with reference to optical signals having a wavelength of 910 nm (e.g., the second wavelength), the present disclosure contemplates that the third optical transmitter 408 may be configured to generate optical signals having any wavelength so as to communicate with the first optical receiver 110 as described herein. The third optical transceiver 404 may further include a third optical receiver 410. The third optical receiver 410 may be a photodiode configured to receive optical signals having the first wavelength. By way of example, the third optical receiver 410 may be configured to receive optical signals having a wavelength of 850 nm at a bandwidth of, for example, 50 Gb/s. Although described herein with reference to optical signals having a wavelength of 850 nm (e.g., the first wavelength), the present disclosure contemplates that the third optical receiver 410 may be configured to receive optical signals having any wavelength so as to communicate with the first optical transmitter 104 as described herein.

The second optical communication module 400 may include the fourth optical transceiver 406 that includes a fourth optical transmitter 412. The fourth optical transmitter 412 may be configured to generate optical signals having the first wavelength. By way of example, the fourth optical transmitter 412 may include a VCSEL configured to generate optical signals having a wavelength of 850 nm for transmission via four (4) transmission lanes at a bandwidth of, for example, 50 Gb/s. Although described herein with reference to optical signals having a wavelength of 850 nm (e.g., the first wavelength), the present disclosure contemplates that the fourth optical transmitter 412 may be configured to generate optical signals having any wavelength so as to communicate with the second optical receiver 114 as described herein. The fourth optical transceiver 406 may further include a fourth optical receiver 414. The fourth optical receiver 414 may be a photodiode configured to receive optical signals having the second wavelength. By way of example, fourth optical receiver 414 may be configured to receive optical signals having a wavelength of 910 nm at a bandwidth of, for example, 50 Gb/s. Although described herein with reference to optical signals having a wavelength of 910 nm (e.g., the second wavelength), the present disclosure contemplates that the fourth optical receiver 414 may be configured to receive optical signals having any wavelength so as to communicate with the second optical transmitter 112 as described herein.

With continued reference to FIG. 4, the first optical communication module 100 may include a connector 109 configured to engage a corresponding connector 403 of a networking system or component. Similarly, the second optical communication module 400 may include a connector 408 configured to engage a corresponding connector 405 of the networking system of component. As illustrated, the networking system or component may include a networking cable 401 configured to provide optical and/or electrical connectivity between the optical communication module 100 and the second optical communication module 400. Although illustrated in FIG. 4 with male/female connectors, the present disclosure contemplates that the connectors 109, 403, 408, and 405 may include any feature used to provide optical and/or electrical communication between networking components.

As described above with reference to the second lens assembly, the lens assembly 300 may be equally applicable to the third transceiver 404 and the fourth transceiver 406. For example, a third lens assembly (not shown) may include a first reflective surface proximate the third optical transmitter 408 configured to reflect optical signals generated by the third optical transmitter 408 for transmission by the third optical communication medium 416. The first reflective surface of such a third lens assembly (not shown) may support a filter. A second reflective surface may be positioned proximate the third optical receiver 410 and may be configured to reflect optical signals received from the third optical communication medium 416 to the third optical receiver 408. The filter of such a third lens assembly (not shown) may be configured to pass optical signals received from the third optical communication medium 416 at the first reflective surface having the first wavelength to the third optical receiver 410.

As described above with reference to the first lens assembly 300 of FIGS. 3A-3B, a fourth lens assembly (not shown) may include a first reflective surface proximate the fourth optical transmitter 412 configured to reflect optical signals generated by the fourth optical transmitter 412 for transmission by the fourth optical communication medium 418. Furthermore, such a fourth lens assembly (not shown) may include a second reflective surface proximate the fourth optical receiver 414 and supporting a filter. The second reflective surface may be configured to reflect optical signals received from the fourth optical communication medium 418 to the fourth optical receiver 414. For example, the filter of such a fourth lens assembly (not shown) may be configured to pass optical signals received from the fourth optical transmitter 412 having the first wavelength into the fourth optical communication medium 418 and may be configured to direct optical signals received from the fourth optical communication medium 418 having the second wavelength into the fourth optical receiver 414.

Figure 5:
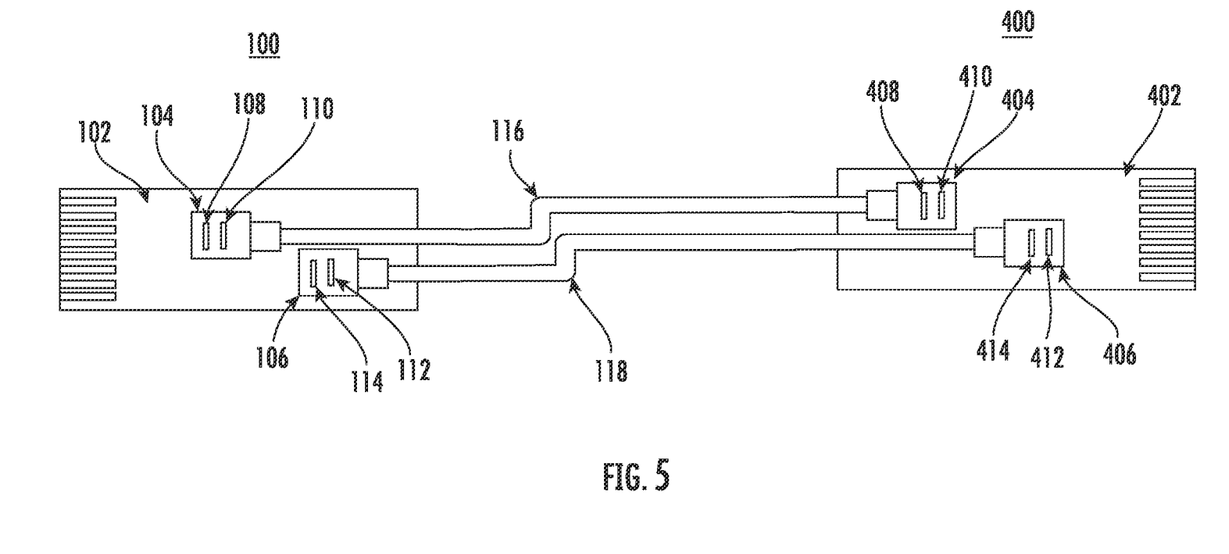
FIG. 5 illustrates an example optical communication cable including the optical communication module of FIG. 1 in accordance with some embodiments described herein.

With reference to FIG. 5, an example optical communication cable 500 including the optical communication module 100 and the second optical communication module 400 is illustrated. In some embodiments, the optical communication modules of the present disclosure may be attached or otherwise formed on opposite ends of one or more optical communication mediums so as to form an optical communication cable 500. By way of continued example, the first optical communication medium 116 may include four (4) optical fibers providing optical communication between the first optical transceiver 104 and the third optical transceiver 404. Similarly, the second optical communication medium 118 may include four (4) optical fibers providing optical communication between the second optical transceiver 106 and the fourth optical transceiver 406. In such an embodiment, the first optical communication medium 116 and the second optical communication medium 118 may form an optical cable including eight (8) transmission lanes over the eight (8) optical fibers of the optical cable. Although described herein with distinct optical fibers, the present disclosure contemplates that the optical communication modules 100, 400 may, in some embodiments, be used with wavelength division multiplexing (WDM) techniques to transmit a plurality of optical signals over a common optical medium.

Example Methods of Manufacturing

Figure 6:
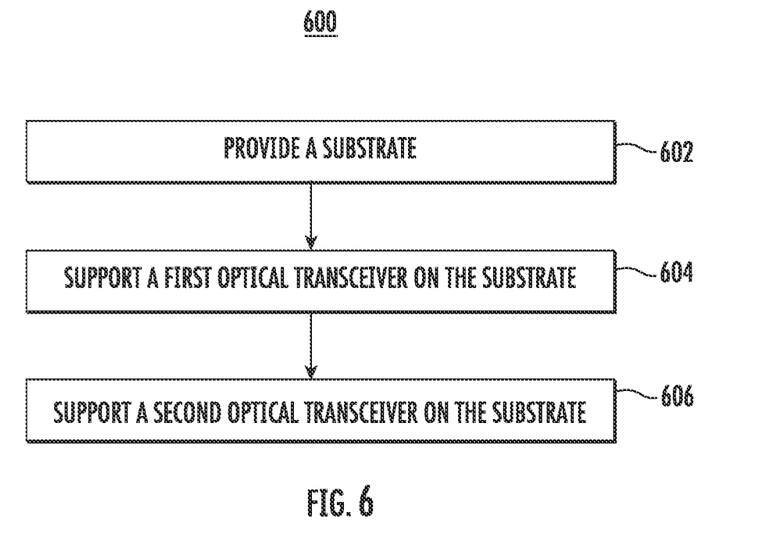
FIG. 6 is a flowchart illustrating a method of manufacturing an optical communication module according to an example embodiment.

With reference to FIG. 6, a method of manufacturing an optical communication module is illustrated. The method (e.g., method 600) may include the steps of providing a substrate (e.g., a printed circuit board (PCB)) at operation 602. The method 600 may utilize any known means for creating substrates or PCBs (e.g., subtractive processes, additive processes, semi-additive processes, chemical etching, copper patterning, lamination, plating and coating, or the like) in providing the substrate at operation 602. The substrate (e.g., PCB) may comprise a dielectric material, a glass material, a polymer material, an amorphous material, or the like. As described above, the present disclosure contemplates that the substrate (e.g., PCB) provided at operation 602 may comprise any material configured for use with optoelectronic components and/or configured to define or support electrical connection elements or features (e.g., wires, traces, etc.) to provide electrical connectivity between optoelectronic components.

The method 600 may further include supporting a first optical transceiver on the substrate at operation 604. Supporting the first optical transceiver at operation 604 may include providing a first optical transmitter 108 configured to generate optical signals having a first wavelength. By way of continued example, the first optical transmitter 108 may include a VCSEL configured to generate optical signals having a first wavelength for transmission to a first optical communication medium 116 in optical communication with the first optical transceiver 104 for receipt by a corresponding optical receiver (e.g., third optical receiver 410 in FIG. 4) in optical communication with the first optical communication medium 116.

Supporting the first optical transceiver at operation 604 may include providing a first optical receiver 110 configured to receive optical signals having a second wavelength different from the first wavelength. By way of example, the first optical receiver 110 may be configured to receive optical signals having the second wavelength transmitted by the first optical communication medium 116 from a corresponding optical transmitter (e.g., third optical transmitter 408 in FIG. 4) in optical communication with the first optical communication medium 116. As described above with reference to FIGS. 3A-3B, the first optical transceiver 104 may be coupled with a corresponding lens assembly 300 configured to filter and/or direct optical signals to the first optical transmitter 108 and the first optical receiver 110.

The method 600 may further include supporting a second optical transceiver on the substrate at operation 606. Supporting the second optical transceiver at operation 606 may include providing a second optical transmitter 112 configured to generate optical signals having the second wavelength (e.g., the same wavelength as the first optical receiver 110). By way of example, the second optical transmitter 112 may include a VCSEL configured to generate optical signals having a second wavelength for transmission to a second optical communication medium 118 in optical communication with the second optical transceiver 106 for receipt by a corresponding optical receiver (e.g., fourth optical receiver 414 in FIG. 4) in optical communication with the second optical communication medium 118.

Supporting the second optical transceiver 106 at operation 606 may also include providing a second optical receiver 114 configured to receive optical signals having the first wavelength (e.g., the same wavelength as generated by the first optical transmitter 108). By way of example, the second optical receiver 114 may be configured to receive optical signals having the first wavelength transmitted by the second optical communication medium 118 from a corresponding optical transmitter (e.g., fourth optical transmitter 412 in FIG. 4) in optical communication with the second optical communication medium 118. Similar to operation 604, the second optical transceiver 106 may be coupled with a corresponding lens assembly configured to filter and/or direct optical signals to the second optical transmitter 112 and the second optical receiver 114.

Many modifications and other embodiments of the inventions set forth herein will come to mind to one skilled in the art to which these inventions pertain having the benefit of the teachings presented in the foregoing descriptions and the associated drawings. Although the figures only show certain components of the methods and systems described herein, it is understood that various other components may also be part of any optical component or optoelectronic element. In addition, the method described above may include fewer steps in some cases, while in other cases may include additional steps. Modifications to the steps of the method described above, in some cases, may be performed in any order and in any combination.

Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An optical communication module comprising:
  a substrate;
  a first optical transceiver supported by the substrate, the first optical transceiver comprising:
    a first optical transmitter configured to generate optical signals having a first wavelength;
    a first optical receiver configured to receive optical signals having a second wavelength, wherein the first optical receiver is positioned in an optical path of the first optical transmitter; and
  a second optical transceiver supported by the substrate, the second optical transceiver comprising:
    a second optical transmitter configured to generate optical signals having the second wavelength; and
    a second optical receiver configured to receive optical signals having the first wavelength, wherein the second optical transmitter is positioned in an optical path of the second optical receiver.

2. The optical communication module according to claim 1, further comprising:
  a first optical communication medium in optical communication with the first optical transceiver; and
  a second optical communication medium in optical communication with the second optical transceiver.

3. The optical communication module according to claim 2, further comprising a first lens assembly coupled with the first optical transceiver, wherein the first lens assembly comprises a filter configured to:
  pass optical signals received from the first optical transmitter having the first wavelength into the first optical communication medium; and
  direct optical signals received from the first optical communication medium having the second wavelength into the first optical receiver.

4. The optical communication module according to claim 3, wherein the first lens assembly further comprises:
  a first reflective surface proximate the first optical transmitter configured to reflect optical signals generated by the first optical transmitter for transmission by the first optical communication medium; and
  a second reflective surface proximate the first optical receiver and supporting the filter, the second reflective surface configured to reflect optical signals received from the first optical communication medium to the first optical receiver.

5. The optical communication module according to claim 2, further comprising a second lens assembly coupled with the second optical transceiver, wherein the second lens assembly comprises a filter configured to:
  direct optical signals received from the second optical transmitter having the second wavelength into the second optical communication medium; and
  pass optical signals received from the second optical communication medium having the first wavelength into the second optical receiver.

6. The optical communication module according to claim 5, wherein the second lens assembly further comprises:
  a first reflective surface proximate the second optical transmitter supporting the filter, the first reflective surface configured to reflect optical signals generated by the second optical transmitter for transmission by the second optical communication medium; and
  a second reflective surface proximate the second optical receiver configured to reflect optical signals received from the second optical communication medium to the second optical receiver.

7. The optical communication module according to claim 2, further comprising a connector operably coupled with the first optical communication medium and the second optical communication medium, the connector configured to engage a corresponding connector of a networking system.

8. An optical communication cable comprising:
  a first substrate;
    a first optical transceiver supported by the first substrate, the first optical transceiver comprising:
      a first optical transmitter configured to generate optical signals having a first wavelength;
      a first optical receiver configured to receive optical signals having a second wavelength, wherein the first optical receiver is positioned in an optical path of the first optical transmitter; and
    a second optical transceiver supported by the first substrate, the second optical transceiver comprising:
      a second optical transmitter configured to generate optical signals having the second wavelength; and
      a second optical receiver configured to receive optical signals having the first wavelength, wherein the second optical transmitter is positioned in an optical path of the second optical receiver;
  a second substrate;
    a third optical transceiver supported by the second substrate, the third optical transceiver comprising:
      a third optical transmitter configured to generate optical signals having the second wavelength;
      a third optical receiver configured to receive optical signals having the first wavelength, wherein the third optical transmitter is positioned in an optical path of the third optical receiver; and
    a fourth optical transceiver supported by the second substrate, the fourth optical transceiver comprising:
      a fourth optical transmitter configured to generate optical signals having the first wavelength; and
      a fourth optical receiver configured to receive optical signals having the second wavelength, wherein the fourth optical receiver is positioned in an optical path of the fourth optical transmitter;
  a first optical communication medium configured to provide optical communication between the first optical transceiver and the third optical transceiver; and
  a second optical communication medium configured to provide optical communication between the second optical transceiver and the fourth optical transceiver.

9. The optical communication cable according to claim 8, further comprising a first lens assembly coupled with the first optical transceiver, wherein the first lens assembly comprises a filter configured to:
  pass optical signals received from the first optical transmitter having the first wavelength into the first optical communication medium; and direct optical signals received from the first optical communication medium having the second wavelength into the first optical receiver.

10. The optical communication cable according to claim 9, wherein the first lens assembly further comprises:
 a first reflective surface proximate the first optical transmitter configured to reflect optical signals generated by the first optical transmitter for transmission by the first optical communication medium; and
 a second reflective surface proximate the first optical receiver and supporting the filter, the second reflective surface configured to reflect optical signals received from the first optical communication medium to the first optical receiver.

11. The optical communication cable according to claim 8, further comprising a second lens assembly coupled with the second optical transceiver, wherein the second lens assembly comprises a filter configured to:
 direct optical signals received from the second optical transmitter having the second wavelength into the second optical communication medium; and
 pass optical signals received from the second optical communication medium having the first wavelength into the second optical receiver.

12. The optical communication cable according to claim 11, wherein the second lens assembly further comprises:
 a first reflective surface proximate the second optical transmitter and supporting the filter, the first reflective surface configured to reflect optical signals generated by the second optical transmitter for transmission by the second optical communication medium; and
 a second reflective surface proximate the second optical receiver configured to reflect optical signals received from the second optical communication medium to the second optical receiver.

13. The optical communication cable according to claim 8, further comprising a third lens assembly coupled with the third optical transceiver, wherein the third lens assembly comprises a filter configured to:
 direct optical signals received from the third optical transmitter having the second wavelength into the first optical communication medium; and
 pass optical signals received from the first optical communication medium having the first wavelength into the third optical receiver.

14. The optical communication cable according to claim 13, wherein the third lens assembly further comprises:
 a first reflective surface proximate the third optical transmitter and supporting the filter, the first reflective surface configured to reflect optical signals generated by the third optical transmitter for transmission by the first optical communication medium; and
 a second reflective surface proximate the third optical receiver configured to reflect optical signals received from the first optical communication medium to the third optical receiver.

15. The optical communication cable according to claim 8, further comprising a fourth lens assembly coupled with the fourth optical transceiver, wherein the fourth lens assembly comprises a filter configured to:
 pass optical signals received from the fourth optical transmitter having the first wavelength into the second optical communication medium; and
 direct optical signals received from the second optical communication medium having the second wavelength into the fourth optical receiver.

16. The optical communication cable according to claim 15, wherein the fourth lens assembly further comprises:
 a first reflective surface proximate the fourth optical transmitter configured to reflect optical signals generated by the fourth optical transmitter for transmission by the second optical communication medium; and
 a second reflective surface proximate the fourth optical receiver and supporting the filter, the second reflective surface configured to reflect optical signals received from the second optical communication medium to the fourth optical receiver.

17. A method of manufacturing an optical communication module, the method comprising:
 providing a substrate;
 supporting a first optical transceiver on the substrate, wherein the first optical transceiver comprises:
  a first optical transmitter configured to generate optical signals having a first wavelength;
  a first optical receiver configured to receive optical signals having a second wavelength, wherein the first optical receiver is positioned in an optical path of the first optical transmitter; and
 supporting a second optical transceiver on the substrate, wherein the second optical transceiver comprises:
  a second optical transmitter configured to generate optical signals having the second wavelength; and
  a second optical receiver configured to receive optical signals having the first wavelength, wherein the second optical transmitter is positioned in an optical path of the second optical receiver.

18. The method according to claim 17, further comprising:
 providing a first optical communication medium in optical communication with the first optical transceiver; and
 providing a second optical communication medium in optical communication with the second optical transceiver.

19. The method according to claim 18, further comprising providing a connector operably coupled with the first optical communication medium and the second optical communication medium, the connector configured to engage a corresponding connector of a networking system.

20. The method according to claim 18, further comprising:
 providing a first lens assembly coupled with the first optical transceiver, wherein the first lens assembly comprises a filter configured to:
  pass optical signals received from the first optical transmitter having the first wavelength into the first optical communication medium; and
  direct optical signals received from the first optical communication medium having the second wavelength into the first optical receiver; and
 providing a second lens assembly coupled with the second optical transceiver, wherein the second lens assembly comprises a filter configured to:
  direct optical signals received from the second optical transmitter having the second wavelength into the second optical communication medium; and
  pass optical signals received from the second optical communication medium having the first wavelength into the second optical receiver.

* * * * *